(12) United States Patent
Leiber

(10) Patent No.: US 12,509,043 B2
(45) Date of Patent: Dec. 30, 2025

(54) BRAKE SYSTEM, IN PARTICULAR FOR AUTOMATIC DRIVING

(71) Applicant: IPGATE AG, Pfäffikon (CH)

(72) Inventor: Heinz Leiber, Oberriexingen (DE)

(73) Assignee: IPGATE AG, Pfäffikon (CH)

( * ) Notice: Subject to any disclaimer, the term of this patent is extended or adjusted under 35 U.S.C. 154(b) by 1096 days.

(21) Appl. No.: 17/053,009

(22) PCT Filed: May 9, 2019

(86) PCT No.: PCT/EP2019/061909
§ 371 (c)(1),
(2) Date: Nov. 4, 2020

(87) PCT Pub. No.: WO2019/215278
PCT Pub. Date: Nov. 14, 2019

(65) Prior Publication Data
US 2021/0122348 A1    Apr. 29, 2021

(30) Foreign Application Priority Data

May 9, 2018    (DE) ...................... 10 2018 111 126.6

(51) Int. Cl.
*B60T 13/74* (2006.01)
*B60T 7/04* (2006.01)
(Continued)

(52) U.S. Cl.
CPC ............ *B60T 13/662* (2013.01); *B60T 7/042* (2013.01); *B60T 13/686* (2013.01); *B60T 13/741* (2013.01);
(Continued)

(58) Field of Classification Search
CPC .... B60T 13/686; B60T 13/741; B60T 13/745; B60T 2270/402; B60T 2270/406;
(Continued)

(56) References Cited

U.S. PATENT DOCUMENTS

| 4,658,939 A | 4/1987 | Kircher et al. |
| 4,793,447 A | 12/1988 | Taig et al. |

(Continued)

FOREIGN PATENT DOCUMENTS

| CN | 1931646 A | 3/2007 |
| CN | 101362460 A | 2/2009 |

(Continued)

OTHER PUBLICATIONS

Machine translation of 102008051350, retrieved 2024 (Year: 2024).*
(Continued)

*Primary Examiner* — Bradley T King
(74) *Attorney, Agent, or Firm* — Panitch Schwarze Belisario & Nadel LLP

(57) ABSTRACT

A brake system for a motor vehicle may comprise an actuating device, in particular a brake pedal, a pressure supply device, in particular a hydraulic piston-cylinder unit driven by an electric motor driven, for hydraulically adjusting a brake piston of at least one wheel brake, wherein the pressure supply device works in particular on wheel brakes of the front axle of the motor vehicle, and having at least one electromechanically actuatable wheel brake, for electrically adjusting a brake piston of the wheel brake, in particular for the rear wheels of the motor vehicle. For electromechanically actuating the wheel brake, an electric motor and a first transmission, which transmits the driving force of the motor to a further transmission, in particular a ball-screw transmission, are provided. One or more (hydraulic and/or electric) components or subsystems of the brake system are designed to have at least one layer of redundancy.

26 Claims, 8 Drawing Sheets

(51) Int. Cl.
*B60T 13/66* (2006.01)
*B60T 13/68* (2006.01)

(52) U.S. Cl.
CPC ....... *B60T 13/745* (2013.01); *B60T 2270/402* (2013.01); *B60Y 2400/81* (2013.01)

(58) Field of Classification Search
CPC ...... B60T 17/225; B60T 13/662; B60T 7/042; F16D 2121/04; F16D 2121/24; F16D 2127/06

See application file for complete search history.

(56) References Cited

U.S. PATENT DOCUMENTS

| | | | |
|---|---|---|---|
| 6,481,543 | B1 | 11/2002 | Shaw et al. |
| 7,559,413 | B2 | 7/2009 | Haffelder et al. |
| 8,540,324 | B2 | 9/2013 | Leiber et al. |
| 10,358,119 | B2* | 7/2019 | Besier .................. B60T 13/142 |
| 2006/0163939 | A1* | 7/2006 | Kuramochi ............. B60T 8/885 |
| | | | 303/122.04 |
| 2006/0267402 | A1 | 11/2006 | Leiter et al. |
| 2009/0057073 | A1 | 3/2009 | Ishii |
| 2009/0091180 | A1 | 4/2009 | Iwasaki et al. |
| 2010/0051395 | A1* | 3/2010 | Sano .................... B60T 13/741 |
| | | | 188/162 |
| 2010/0241330 | A1* | 9/2010 | Hartmann ............... B60T 8/344 |
| | | | 701/70 |
| 2011/0042171 | A1 | 2/2011 | Knechtges |
| 2011/0162935 | A1* | 7/2011 | Winkler .............. F16H 25/2238 |
| | | | 192/219.4 |
| 2013/0232966 | A1* | 9/2013 | Murayama ............. B60T 7/042 |
| | | | 60/545 |
| 2013/0333376 | A1* | 12/2013 | Murayama ........... B60T 13/745 |
| | | | 60/545 |
| 2016/0009263 | A1* | 1/2016 | Feigel .................. B60T 11/224 |
| | | | 303/15 |
| 2016/0264113 | A1* | 9/2016 | Feigel .................. B60T 8/4086 |
| 2016/0278245 | A1* | 9/2016 | Koga .................... B60T 13/662 |
| 2016/0355169 | A1* | 12/2016 | Ohlig ................... B60T 13/741 |
| 2017/0072920 | A1* | 3/2017 | Besier .................. B60T 8/4081 |
| 2018/0072285 | A1* | 3/2018 | Tanaka ................. F16D 55/226 |
| 2018/0194337 | A1* | 7/2018 | Leiber .................... B60T 7/042 |
| 2019/0031165 | A1* | 1/2019 | Besier .................... B60T 8/348 |
| 2019/0344769 | A1* | 11/2019 | Zimmermann ......... B60T 8/326 |
| 2019/0351886 | A1* | 11/2019 | Besier .................... B60T 7/042 |
| 2020/0079335 | A1* | 3/2020 | Linhoff .................. B60T 8/321 |
| 2020/0114894 | A1* | 4/2020 | Leiber ...................... B60T 7/12 |
| 2020/0223408 | A1* | 7/2020 | Goto .................... B60T 13/662 |
| 2020/0298807 | A1* | 9/2020 | Ganzel ................... B60T 13/62 |
| 2021/0122349 | A1* | 4/2021 | Leiber .................... B60T 7/042 |
| 2022/0105914 | A1* | 4/2022 | Leiber .................. B60T 13/662 |
| 2022/0126806 | A1* | 4/2022 | Leiber ..................... F15B 11/17 |
| 2023/0056306 | A1* | 2/2023 | Tarandek ................ F16D 65/18 |

FOREIGN PATENT DOCUMENTS

| | | | |
|---|---|---|---|
| CN | 105835857 A | 8/2016 | |
| DE | 3410006 A1 | 9/1985 | |
| DE | 19817892 A1 | 10/1999 | |
| DE | 10010735 A1 | 1/2001 | |
| DE | 10319194 B3 | 9/2004 | |
| DE | 102005055751 A1 | 11/2006 | |
| DE | 102008051350 A1 * | 4/2009 | ......... F16H 25/2238 |
| DE | 102010050132 A1 | 5/2012 | |
| DE | 102011110892 A1 | 2/2013 | |
| DE | 102012216590 A1 | 3/2014 | |
| DE | 102013018073 A1 | 5/2015 | |
| DE | 202015008975 U1 * | 7/2016 | ................ B60T 1/10 |
| DE | 102015213866 B3 | 12/2016 | |
| DE | 102016112971 A1 | 1/2018 | |
| EP | 2878501 A1 | 6/2015 | |
| JP | 11287269 A * | 10/1999 | |
| WO | 2008092683 A1 | 8/2008 | |
| WO | 2015036623 A2 | 3/2015 | |
| WO | 2015177207 A1 | 11/2015 | |
| WO | 2016023994 A1 | 2/2016 | |
| WO | 2016029994 A1 | 3/2016 | |
| WO | 2016146223 A2 | 9/2016 | |
| WO | 2016146224 A1 | 9/2016 | |
| WO | 2016146692 A1 | 9/2016 | |

OTHER PUBLICATIONS

Search Report issued May 6, 2019 in DE Application No. 10 2018 111 126.6.

Int'l Search Report and Written Opinion issued Oct. 29, 2019 Int'l Application No. PCT/EP2019/061909, English translation of Int'l Search Report only.

Int'l Search Report and Written Opinion issued Aug. 14, 2019 in Int'l Application No. PCT/EP2019/061924, English translation of Int'l Search Report only.

Office Action issued Jan. 25, 2022 in Chinese Application No. 201980031319.1.

* cited by examiner

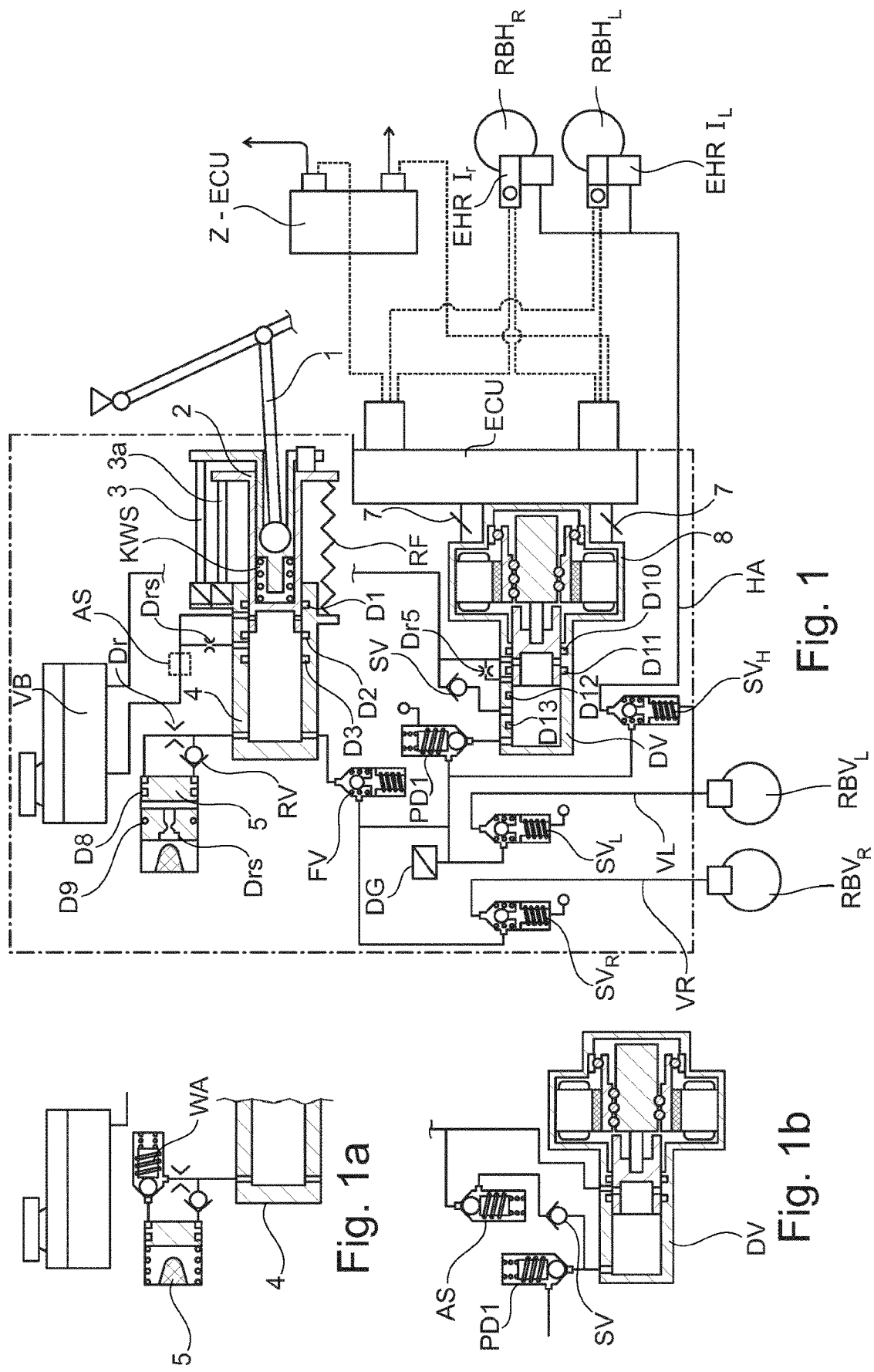

BRAKE SYSTEM, IN PARTICULAR FOR AUTOMATIC DRIVING

CROSS-REFERENCE TO RELATED APPLICATION

This application is a Section 371 of International Application No. PCT/EP2019/061909, filed May 9, 2019, which was published in the German language on Nov. 14, 2019 under International Publication No. WO 2019/215278 A1, which claims priority under 35 U.S.C. § 119(b) to German Patent Application No. 10 2018 111 126.6, filed May 9, 2018, the disclosures of which are incorporated herein by reference.

The invention relates to a brake system.

PRIOR ART

Future brake systems must satisfy various increased or additional requirements. These are in particular extreme fail safety ("fail-operational" FO) for automated driving (AD), a reliable immobilizing brake in electrically driven vehicles (electric vehicles), in the case of which the conventional redundant mechanical parking lock in the transmission is omitted.

So-called combination brakes (EHC) are known in which a hydraulically actuated braking device is provided at the front axle (VA) and an electrically actuated braking device is provided at the rear axle (HA). Such a combination brake is presented for example in DE 103 19 194 B3. In the case of EHC solutions, self-locking and non-self-locking reduction gear mechanisms have been proposed for the electrically actuated braking device. A parking lock is necessary in the case of non-self-locking reduction gear mechanisms. However, in the event of failure of the lock, no immobilizing brake action is available. The electric motor power of such brakes is determined by the requirement for so-called "time to lock" up to, for example, 100 bar (TTL). Self-locking reduction gear mechanisms are used predominantly in electric immobilizing brakes or electric parking locks (EPB), for example of DE 10 2015 213866, because the TTL requirements are low. Here, legislators stipulate primarily a sufficient EPB action or parking brake action on slopes. In the case of self-locking reduction gear mechanisms, the gear ratio can also be selected to be high, which, in spite of poor efficiency, results in a motor with low power. In the case of the combination brake (EHC), the motor power is determined by TTL and efficiency, which means that the motor cannot be dimensioned to be small despite the relatively low electrical braking action at the rear axle. The electronic open-loop and closed-loop control unit (ECU), which is positioned with the complete electrical control means at the brake caliper, is expensive owing to the high temperatures, and the failure rate is accordingly high. Force sensors are required for exact setting of the braking force. Without additional measures, this combination brake (EHC) does not satisfy the "fail-operational" (FO) requirements for higher levels greater than 4 (according to the VDA/SAE standard).

In the case of the known combination brakes with simpler safety, if the hydraulic braking device fails, electrical braking is performed at the rear axle and vice versa. Such a failure however leads to considerable losses in braking action of up to more than 50% in the event of failure of the hydraulically braked front-axle brake. A failure of the electric brake moreover possibly leads to the failure of the immobilizing brake. Self-locking reduction gear mechanisms are therefore used. Here, there is however the problem that, in the case of an electric service brake being used in the event of blocking of the gear mechanism during travel, the brake can quickly overheat, with the risk of fire, in the case of very high braking power.

Also known are electric parking brakes (EPB) with hydraulic assistance and with a motor of reduced size, as presented for example in DE 198 17 892 (E99). These have however not become established because, in the event of failure of the hydraulics, a failure of the immobilizing brake also occurs.

OBJECT OF THE INVENTION

The invention is based on the object of creating a cost-effective brake system with a small installation space, versatile application possibilities and a high level of fail safety, even for autonomous driving up to level 5 (according to VDA/SAE: "no driver required from starting point to destination").

Achievement of the Object and Advantages of the Invention

The object of the invention may be achieved by means of the features of the various appended claims.

It is therefore the basic concept of the solution according to the invention that, in the case of a combination brake system with a hydraulic brake at the front axle (VA) and electrical or electromechanical brake at the rear axle (HA), one or more (hydraulic and/or electrical) components or subsystems of the brake system are implemented redundantly.

Advantageous embodiments and configurations of the invention are contained in the further claims and described in more detail in the description of the figures.

Here, the electromechanically actuatable wheel brake advantageously has an additional or redundant, hydraulically actuatable adjustment device. The electric and hydraulic adjustment of the wheel brake achieves, inter alia, the full service braking action and immobilizing braking action of the wheel brakes according to the invention.

The rear axle brake may also have additional or redundant devices, in particular also to prevent a blocking of the adjustment and to ensure the braking action for an increase or reduction of the braking torque despite the self-locking gear mechanism.

The design according to the invention makes possible a reliable immobilizing brake and the use of motors with lower power, since TTL requirements are satisfied by the hydraulic assistance and the electric brake does not have to satisfy any TTL requirements. The hydraulic adjustment acts by means of the adjustment piston, which acts on the brake piston of the wheel brake via a spindle (without rotation of the latter) with a ball-screw drive (KGT). This makes possible a fast build-up of the braking torque, up to the level of the locking limit. The remainder of the increase takes place with the electric brake via gear mechanism and ball-screw drive (KGT) (in the adjustment piston); this does not require a high actuation speed.

The ABS operation with build-up and dissipation of the braking torque is also expediently performed electrically, because normally no high adjustment speeds are required for this. In the case of major changes in the braking action, such as a µ step change, it is preferably the case for coarse adjustment that only the hydraulic control is effective. In the event of failure of the electrical adjustment, the hydraulic adjustment according to the invention takes effect. Otherwise, the electrical adjustment acts alone, for example in the event of failure of the pressure supply (DV) of the hydraulics. In the case of the front axle (VA) and the rear axle (HA), the foot-imparted force then continues to act on the master cylinder (HZ) to assist the electrically actuated brake of the rear axle and the braking action thereof. This situation is extremely rare owing to the many redundancies in the case of seals of the piston-cylinder units (pressure supply DV, master cylinder HZ, travel simulator WS), valves and electric motor with 2×3-phase control, all features for so-called "fail-operational" (FO). In the case of this concept, the parking lock of the combination brake (EHC) for the immobilizing brake function, which should be implemented redundantly for FO requirements, is also omitted.

It is also essential in the concept according to the invention that the hydraulic adjusting device or the hydraulically actuated adjustment piston acts on the brake piston via the gear mechanism (KGT), in particular via a spindle of the gear mechanism (KGT). Here, a pinion is expediently provided between the motor gear mechanism for transmitting the electric motor torque and the gear mechanism (KGT) in order to transmit the drive force of the motor to the brake piston. Here, the pinion allows an axial displacement of the spindle with respect to the motor gear mechanism, in particular of a worm wheel in which the pinion is arranged displaceably. Thus, in the event of blocking of the gearwheel drive of the motor gear mechanism, the hydraulic adjustment piston can impart the braking force. Details of the adjustment even in the event of different faults are discussed in the description of the figures. The movement/function or position of the adjustment piston may be monitored by a sensor. Alternatively, the movement of the adjustment piston may also be measured by means of the delivery rate of the pressure supply.

With a redundant immobilizing brake, the mechanical parking lock can also be omitted, which is considerably more complex in the case of a purely electric drive than the parking lock in the case of automatic transmissions.

The electrically actuated brake requires a force transmitter (KG) for the adjustment piston, because the motor current measurement is too inexact, in particular because the actuation is performed via a worm gear mechanism and the efficiency of the worm gear mechanism and the variation thereof during operation with temperature changes and wear cannot be ascertained in a sufficiently reliable manner. The force transmitter is complex and must also be implemented redundantly in the case of FO requirements. With the hydraulic adjustment piston, the pressure measured in the pressure supply determines the braking torque, as is conventional. In the case of the hydraulic actuation via the adjustment piston, the torque calculation by means of motor current measurement is used, which has been determined previously in a characteristic map with comparison of the hydraulic pressure i=f(p). The intermediate disturbance variable of spindle gear mechanism efficiency is thus taken account of. The current measurement is therefore sufficiently exact. This can be refined by virtue of the temperature of the motor being determined in order to additionally take into account the influence of the motor temperature on the torque constant of the electric motor. This results in a characteristic map $i=f(p,T_{motor})$. In future vehicle concepts, the installation space in the engine compartment, in particular in an elongation of the brake pedal, is very constricted. There will no longer be space for current brake force boosters (electric boost) or tandem master cylinders.

For the hydraulic system of the front axle, the simplified 1-box solution can be made very short, approximately only 50% of the overall length of the known electric boost solutions. The concept may also be configured as a 2-box solution, in which only a 1-circuit master cylinder is attached to the bulkhead, with a structural length of only 25%. This requires two hydraulic connections from the master cylinder to the unit, comprising a brake line and a line from the reservoir to the unit. The concept for the single-circuit hydraulic control of the front axle and of the rear axle may be implemented partially or fully redundantly, in order that the highest FO requirements are met.

The combination brake (EHC) may also be configured redundantly in the alternative concept (EHR II) without redundant hydraulic actuation of the rear axle brake, for example by means of a redundant electromagnetic parking lock, non-self-locking, non-blocking spur gear mechanism, motor with 2×3-phase control and redundant master cylinder HZ, travel simulator WS and pressure supply DV. The force sensor may also be configured redundantly or, in the event of a failure, a motor current measurement by means of a characteristic map recorded for example on a test stand may be used as redundancy. In the case of the redundant parking lock, it is expedient to use two solenoids with clamping action in the locked and electrically deenergized state, which solenoids also act on a common blocking element. In this way, redundancy is possible for the locking and for the unlocking.

In the case of the known EHC, the complete controller (ECU) is provided on the brake caliper. Here, the prevailing temperatures are sometimes high and the installation space is limited. Alternatively, a sub-ECU may be used, with a redundant on-board electrical system connection via bus lines. According to the invention, the function of the motor control and also the sensor evaluation may be implemented redundantly. The central computing may be performed in the ECU of the 1- or 2-box or in a central computer (domain structure).

The concept according to the invention may be configured in a modular manner with regard to the requirements for 1-box or 2-box packaging, with or without master cylinder HZ and also in terms of safety from level 5 to level 0, with reduced redundancies and correspondingly lower costs.

Permanent diagnosis during operation and full diagnosis during parking are essential for the redundant functions. With the measures described above, a high FO level can be achieved for autonomous driving level 4 (according to VDA/SAE definition "no driver required in the specific usage situation") or "driver required in the event of a fault" and level 5. Braking close to 70% can be achieved even in the event of a fault, such that, according to ECE regulations, the vehicle does not have to be parked immediately after the fault has occurred and also no red warning lamp is activated.

According to the above, the fully or partially redundant open-loop and closed-loop control device ECU is also connected to a redundant on-board electrical system. This has at least two power supplies with a voltage of 12 to 800 V. In the future, a 12/48 volt on-board electrical system will be standard in many vehicles. It is advantageous here for the open-loop and closed-loop control device ECU, which control motors with 2×3-phase connections, to supply the higher voltage (for example 48 V) to a section with for example 3-phase or n-phase motor control. For example, the dynamics of the motor with the higher voltage are significantly better, and the power loss in the motor control is more favorable.

According to the invention, multiple implementation of the redundancy is also possible, as is known for example in the case of other systems with very high safety requirements (such as controllers in aircraft technology and nuclear power plant technology), for example in the case of aircraft a triple redundancy with a "2 out of 3 circuit" in the event of a fault. The selection of the redundancy is based on the reliable fault detection or also fault detection by plausibility checking. For example, the failure of a seal in a closed system can be reliably detected on the basis of a change in volume, change in pressure or change in position of a piston system during operation or during a special diagnostic cycle. By contrast, this is more difficult in the case of an electrical circuit or sensor circuit. The abovementioned "2 out of 3 circuit" is often used here, that is to say if two of three signals are identical, this configuration is selected. In the case of sensors, it appears expedient to use two redundant sensors with evaluation circuits, for example "2 out of 4". Aside from the diagnosis, the plausibility checking of signals or diagnosis results is also decisive.

Particular advantages arise if the piston of the pressure supply is designed as a double-stroke piston, in particular as a stepped piston. These include continuous delivery during the pressure build-up, a short structural length of the pressure supply DV, and downsizing of the motor.

Exemplary embodiments of the invention and its refinements and further individual features, combinations of features and advantages of the invention will emerge from the following description of the figures, which refers to the drawing.

In detail:

FIG. 1 shows a first embodiment (EHR I) of a brake system for the front axle and the rear axle of a motor vehicle as a 1-box system;

FIG. 1a shows a control means for a travel simulator (WS) (EHRI and EHR II);

FIG. 1b shows redundancy in the DV to a suction valve (EHRI and EHRII);

Figure 1C:
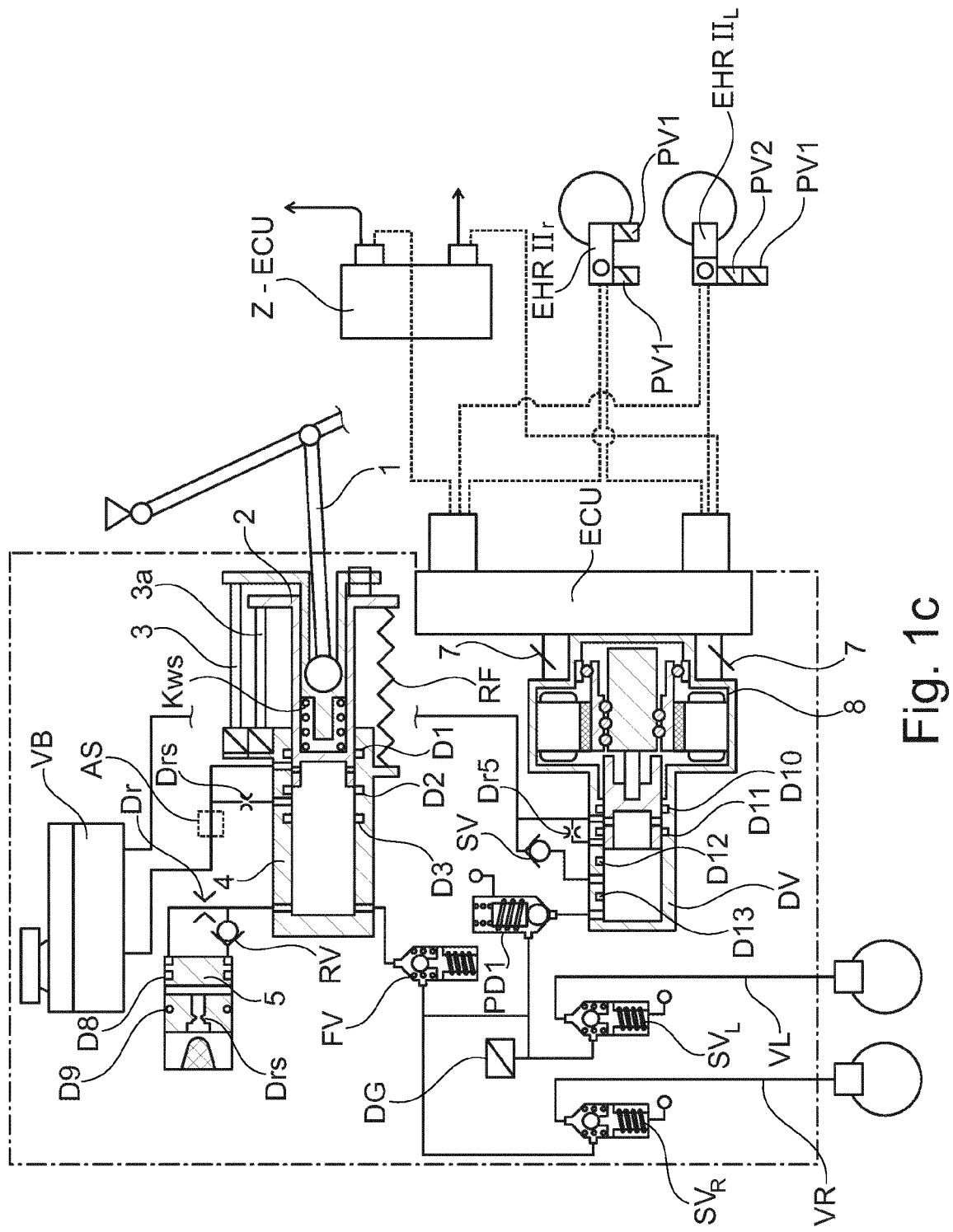
FIG. 1c shows an alternative embodiment (EHR II) of the brake system.

FIG. 1 shows a first embodiment of a brake system (EHRI) with a 1-circuit master cylinder 4, with a reservoir VB and a travel simulator 5, a pressure supply DV, which here in particular has a piston-cylinder unit with an electric drive and gear mechanism, and also valves, a hydraulic rear-axle (HA) control means EHRL and EHRR, an electronic open-loop and closed-loop control unit ECU, and a central open-loop and closed-loop control unit Z-ECU.

The master cylinder 4 is actuated by means of a pedal plunger 4 via a DK piston 2, which is connected in a known manner to the reservoir VB via a breather hole. The DK piston 2 is sealed off by means of various seals in the master cylinder 4: a secondary seal D1 with respect to the outside, a seal D2 with respect to the pressure chamber, and a seal D3 as a redundant seal with respect to D2 with throttle Drs. If seal D3 fails, a leakage flow arises which is limited by the throttle Drs. This leakage flow is identified, as a loss of volume and pedal travel lengthening, by two pedal travel sensors 3, 3a. The throttle Drs is dimensioned such that the pedal travel lengthening during a braking operation is only slight. The throttle Drs may also be used in lines D1 and D2 to the reservoir VB, with an additional check valve (not illustrated), which additional check valve opens in the direction of D1/D2, in parallel with respect to the throttle Drs. An electromagnetic shut-off valve (as described in DE 10 2005 018694 (E87) by the applicant) may also be used. With both solutions, a diagnosis of all seals of the master cylinder and travel simulator is possible by virtue of pressure being applied from the pressure supply DV via a valve FV, and the leakage flow in the throttle DRs and additionally the seals D1, D2 and seal D8 in the travel simulator WS being ascertained for example by way of the piston movement.

A force-travel simulator KWS is connected to the pedal plunger 1 (as described in more detail in DE 10 2010 050132 (E123) by the applicant), which still allows a braking operation, by way of the differential displacement of the pedal travel sensors 3, 3a, even in extreme cases with a blocked piston 2 or travel simulator WS. With the force-travel sensor KWS, it is also possible to identify faults in the travel simulator, such as for example a blocked piston or a leak at a seal. The function of the travel simulator WS with spring, here an elastic spring element which determines the pedal characteristic Fp=f(ssc), is known.

After the pedal is actuated, the valve FV is closed and the volume is fed to the travel simulator WS via the throttle Dr, which determines pedal damping. During a return movement of the pedal, the volume is returned to the piston 5 of the pressure supply DV again via the check valve RV. The travel simulator WS has two seals D8 and D9. Downstream of the seal D8, a channel is connected to the throttle Drs, which channel has the same function as in the case of seal D3. If the seal D8 fails, the leakage flow is throttled by the throttle Drs without a failure of the travel simulator Ws occurring. In the extreme case of failure of the pressure supply DV, the valve FV is opened, such that braking can still be performed using the pedal in the so-called fall-back level. This valve FV may also, as shown in FIG. 2, be implemented redundantly. In FIG. 1, it is assumed that diagnosis of the valve is performed during a parking stoppage, wherein the remaining brake pressure is used for the diagnosis. Inter alia, it is also possible for the leak-tightness to be tested here. Subsequently, before or at the same time as the start of the braking operation, the electrical connection can be tested with the valve closed. Here, the closed valve will not be laden with dirt particles in the valve seat because no flow is possible if the valve seat is leak-tight. The valve can thus be regarded as FO. In the event of actuation of the brake pedal, the driver demand by way of pedal travel or pedal travel sensors 3, 3a is fed in the form of brake pressure, from the pressure supply DV by means of motor and spindle-piston gear mechanism with pressure piston 29 and open valve PD1, to the brake circuits VL, VR and HA. The pressure is detected by a pressure transducer DG. At approximately 90% of the setpoint pressure, the rear-axle valve SVH is closed and the rest of the braking torque increase is performed electrically by the rear axle control means EHRL and EHRR. The reasons for this are discussed further below. The ABS/ESP operation with pressure modulation for pressure dissipation and pressure build-up would normally be performed with electrical adjustment. In the case of relatively great braking torque or pressure changes, the hydraulic adjustment can then again be used up to approximately 90% of the setpoint pressure. Other switching modes are also conceivable, for example only hydraulic adjustment of the service brake and the immobilizing brake electrically, or else the normal brake electrically in the event of failure of the hydraulics.

The pressure dissipation is performed in the same way by adjustment of the piston of the pressure supply DV. Here, the hydraulic pressure acts not directly on the brake piston, as in the case of the EPB, but on an adjustment piston that acts on the spindle drive.

The motor 8 may be controlled in 2×3-phase configuration (known from the control of electric power steering systems) and is considered FO-relevant. A failure of the piston seals D10 to D13 is resolved in a similar manner, by means of redundant seals, to that in the case of the master cylinder 4. If seal D10 fails, seal D12 acts with a slight loss of stroke with limitation of the leakage volume at seal D12 by means of the throttle and diagnosis by way of p=f(stroke× piston area) in relation to the known pressure-volume characteristic curve.

This is defined, as is known, for relevant changes in the state of the brake system, such as poor ventilation.

A further disruption of the pressure supply DV may result from a leaking suction valve SV, which acts up until the middle of the stroke. If said suction valve fails, seal D13 takes effect, that is to say, proceeding from the corresponding stroke, the valve SV is no longer effective, which means that a retraction of the piston in this region for replenishing suction or replenishing delivery for further volume, for example for higher pressure build-up, takes place with reduced suction action by means of the sleeve-like seal D13. This however applies only in the event of a fault and is therefore acceptable. If the pressure supply DV fails despite all measures, a switch is made to the fall-back level RFE. In this case, the 1-circuit master cylinder 4 acts via the open valves FV, SVR, SVL, SVH and closed PD1 into the brake circuits VL, VR, HA and, in addition to the electrical braking action at the rear axle HA, generates intense braking of >50% with 500 N foot-imparted force.

A brake circuit failure is identified by means of the pressure-volume characteristic curve with increased volume, and the valve SVR, SVL, SVH responsible for the brake circuit is closed. These valves may also be implemented redundantly in series with SVRred and SVLred. It is also conceivable to use a double-stroke piston DHK (as described for example in WO 2016/023994 (E138) by the applicant) with a connection to at least one hydraulic circuit LDV.

The EHR has an electromechanical drive with a gear mechanism device, as described in detail below in conjunction with FIGS. 6 to 6*a*. The redundant ECU has a redundant effect on the sub-ECU (red.) of the EHR. In a future architecture with a domain or central computer, the computing for the individual functions may be divided up accordingly.

FIG. 1*a* shows an additional shut-off valve for the travel simulator WS, as is used in current systems with a travel simulator in order to prevent a loss of volume through the travel simulator in the fall-back level RFE. This can be omitted in the system with FO and many redundancies. This valve may also be faulty, and would have to be of doubly redundant construction owing to the faults "not closing" and "not opening".

FIG. 1*b* shows an alternative to the failure of the valve SV by way of an additional shut-off valve AS that acts during aspiration. Said additional shut-off valve is closed during the pressure build-up.

Figures 2, 2A, 2B:
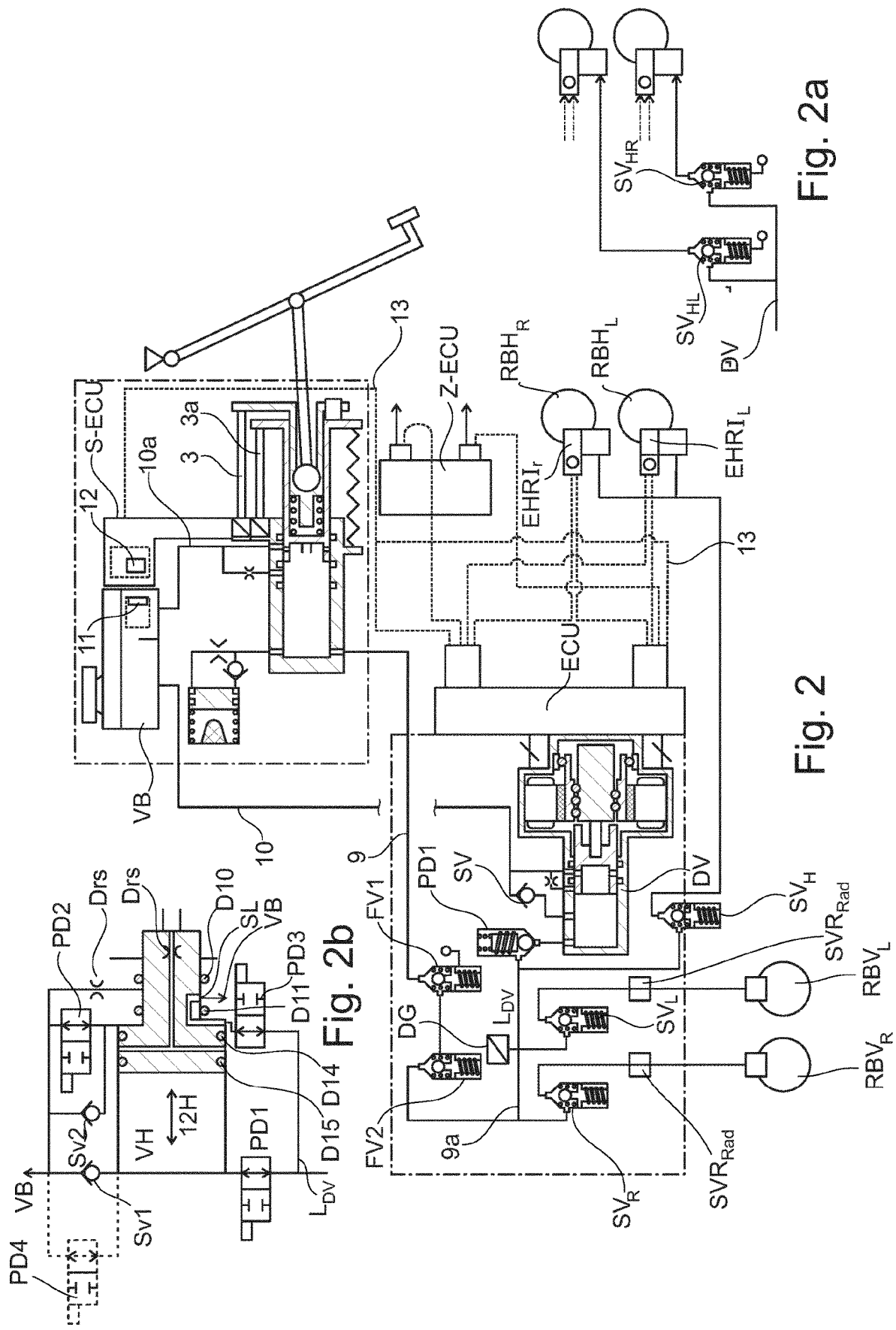
FIG. 2 shows a brake system (EHRI) with redundant valves and a 1-circuit master cylinder (HZ) as a 2-box system.
FIG. 2a shows valves for individual rear-axle (HA) pressure control for a brake system as per FIG. 1 (EHRI)
FIG. 2b shows a single-circuit pressure supply (DV) with a double-stroke piston as a stepped piston.

FIG. 1*c* shows an alternative embodiment EHRII of the brake system which, aside from the rear-axle control, corresponds to that of FIG. 1, that is to say EHRI. In particular, a hydraulic line to the rear-axle wheel brakes is not provided in this embodiment. These are rather actuated purely electrically. Here, an alternative is also shown which likewise has possible redundancy.

In addition to the redundant motor connection with 2×3-phase control, the parking locks PV1 and PV2 may also be configured redundantly, with corresponding diagnosis of the redundancy. In the case of the redundant parking lock, it is expedient for two solenoids with clamping action in the locked and electrically deenergized state to be provided, which also act on the common blocking element, as will be discussed in more detail below with reference to FIG. 7. In this way, redundancy is possible for the locking and the unlocking. The modular concept with corresponding embodiments for the respective safety levels still applies here also, wherein the pressure supply DV is more safety-critical in the case of the electromagnetic parking lock PV. A magnetic clamp PV1 may preferably be used here. If, for example, a redundant magnet coil is energized for parking, the armature is reliably clamped by means of the holding magnet even in the event of failure of the control with corresponding diagnosis of the clamping state, for example by rotation of the motor. The parking position and the unlocking thereof are thus secured. With an appropriate gear mechanism concept, no blocking can occur. Not shown is a force sensor which is customary in the case of EHC and which may also be of redundant configuration, wherein alternatives with motor current calibration by means of a characteristic map are also conceivable, for example on a brake test stand or evaluation of the vehicle deceleration or change as a function of the change in motor current.

FIG. 2 shows a concept which substantially corresponds to that of FIG. 1, which is illustrated as a 1-box solution. The difference lies in the separate packaging of the 1-circuit master cylinder (1-box) and of the pressure supply DV with valve circuit with ECU (2-box).

The 1-circuit master cylinder has an extremely short structural length and also installation space, which can be a key factor for modern vehicle structures. Additional hydraulic and electrical connections to the 2-box are required here. Hydraulic lines are the brake line 9 from the master cylinder HZ and line 10 to the reservoir VB. A second valve FV2 with a special hydraulic connection is also provided. Both inputs from the master cylinder HZ and the pressure supply DV act from the outside on the valve seat of the valve FV2 and FV1 (master cylinder HZ via line 9 and valve FV1 and pressure supply DV via line 9*a* and FV2). In the event that the brake line 9 has a leak, the valve FV1 can be closed, and additionally also FV2. Without this circuit, the pressure supply DV would fail or the valve FV1 would have to be installed in the master cylinder HZ, which would disrupt the installation space and the electrical interface owing to the electrical line to the valve, because they require signal currents of a few mA. The additional electrical connection is necessary from the unit ECU to the sensor ECU. The latter processes the signals of the pedal travel sensors 3 and 3*a* and a level transducer in the reservoir VB with target with evaluation by a sensor element (preferably Hall element) in the sensor ECU. The signal transmission to the unit ECU is performed via a bus line 13, preferably also redundantly.

The hydraulic connection to the rear axle may be made via a valve SVH for both rear wheels (embodiment of FIG. 2) or via in each case one valve SVHR and SVHL for each rear wheel (embodiment of FIG. 2*a*). This has the advantage of wheel-specific hydraulic pressure setting, which is advantageous in ABS/ESP operation. The pressure regulation of all four wheels, in particular in ABS/ESP operation, is expediently performed in multiplex (MUX) operation, in particular as in DE 10 2005 055751 (E90) by the applicant, to which reference is made here in this regard. Alternatively, it is also possible for an additional outlet valve for pressure reduction to be provided in the case of one of the switching valves (SVHR or SVHL) of a wheel brake, in accordance with the patent application (PCT/EP2015/081402), or both switching valves. The solution with a valve without an outlet valve and multiplex (MUX) has the advantage compared to the conventional outlet valve for pressure dissipation in the reservoir VB that no volume loss can occur as a result of a leak in the outlet valve, and fail safety is thus realized because the pressure dissipation and pressure build-up (pressure changes) are performed by back-and-forth movement of the piston. In the case of the present concept, the multiplex operation relates only to the two front-axle brake circuits with valves SVVL and SVVR for individual pressure control. In the case of the rear axle circuit, the pressure is set, for example, to the described 90% of the setpoint pressure. The fine adjustment and the ABS-ESP operation were carried out by means of the individual electrical adjustment.

The control of the valves SV is also of importance here. For reasons of fail safety, for example failure of the pressure supply (p->0) and high wheel pressure, the valve SV must open automatically; this is achieved in that, as shown in the schematic diagram, the connection to the pressure supply DV is situated on the inner side of the valve SV and the outlet is downstream of the valve seat. This circuit is described in more detail in the patent application WO 2016/146224 or PCT/EP2015/081403 by the applicant, to which reference is made here in this regard. All valves SV also have an important function in the event of a brake circuit failure. With appropriate diagnosis, the corresponding valve SV to the leaking brake circuit is closed. Here, too, it is also possible for redundant valves SV to be used, although here a double fault of brake circuit and leaking or non-switchable valve would be present with an extremely low probability of failure or FIT (failure-in-time) value.

FIG. 2*b* shows a single-circuit pressure supply DV with a double-stroke piston DHK as a stepped piston with different area ratios of the piston surfaces, preferably in a ratio of 2:1. The advantages of stepped pistons are described in WO 2015/177207 and WO 2015/036623 by the applicant, to which reference is made here in this regard, and consist inter alia in continuous volume delivery and area switching of forward stroke and return stroke. A smaller area is effective during the return stroke; this means that it is also possible for higher pressures to be generated with the same motor torque, as is typical for the pressure-volume characteristic curve of a brake system. This may also occur during the forward stroke with appropriate valve switching. Depending on the number of valves for switching, the double-stroke piston DHK may also supply 2 brake circuits. In the concept presented here, only one brake circuit is supplied.

During the forward stroke, volume is conveyed by the large piston area into the pressure line LDV via the open valve PD1. The pressure dissipation control may also only be performed by means of the control of the double-stroke piston DHK, by using a further valve PD4 in parallel with respect to valve SV1, as is described in WO 2016/023994 and WO 2016/146692 by the applicant, to which reference is made here in this regard. If the volume is not sufficient, the return stroke RH with a smaller piston area takes place, for higher pressure, via an open valve PD3 into the same line LDV. If yet further volume is to be conveyed at a correspondingly high pressure, valve PD1 and valve PD3 are opened during the forward stroke, such that higher pressure is generated with a smaller area. However, the conveyed volume must be conveyed back again for the pressure dissipation. If this is performed only in the region of the forward stroke, this is performed, as in the case of the normal piston in FIG. 2, by means of the return stroke by means of a stroke increase, such that volume flows back. If it however takes place, in the case of the double-stroke piston DHK, after the return stroke, when the piston is situated at the end of the stroke and are moved back, the volume must be conveyed into the reservoir VB via the opened valve PD2 until the piston is in the initial position again. The rate of pressure change is implemented through pulse width modulation (PWM) operation of valve PD2, PD3 or both. Instead of the valve PD2, breather hole (SL) control with a channel in the piston DHK may also be performed, as is shown in the lower half of FIG. 2*b*. Here, the valve PD3 is open such that the volume flows out via the breather hole SL into the reservoir VB. The flow rate can be implemented by means of the piston control of the opening cross section of the breather hole SL or else by measurement of the corresponding rate of pressure change by means of the pressure transducer DG. The valve PD3 is not required with this control. In parallel or as an alternative to this pressure dissipation control, all valves SV can be controlled by pulse width modulation PWM even when the breather hole is open. Here, during the forward stroke, the connection to the reservoir VB is closed as a result of the breather hole SL being covered, such that the piston rear side subsequently draws in volume via the valve SV in order, as described above, to convey volume for further pressure build-up during the return stroke. The valve PD3 is then switched accordingly. If, as described above, a pressure dissipation is to be performed from the return stroke position, the piston moves into the stroke start position and the volume passes to the reservoir VB via the breather hole.

For fail safety, the failure of the redundant seals D12 and D13 may occur, as in the case of the other seals, via a throttle Drs. The throttle Drs shown for the seals D10 and D11 requires the valve configuration PD1, PD2 and PD3, or a seal D12 must be used with throttle Drs downstream of seal D12, as shown in FIG. 1. Here, too, the solution with double-stroke piston DHK has the advantages of continuous delivery during the pressure build-up, the short structural length of the pressure supply DV and the downsizing of the motor with additional valves (a maximum of two solenoid valves MV and one valve SV).

Figure 3:
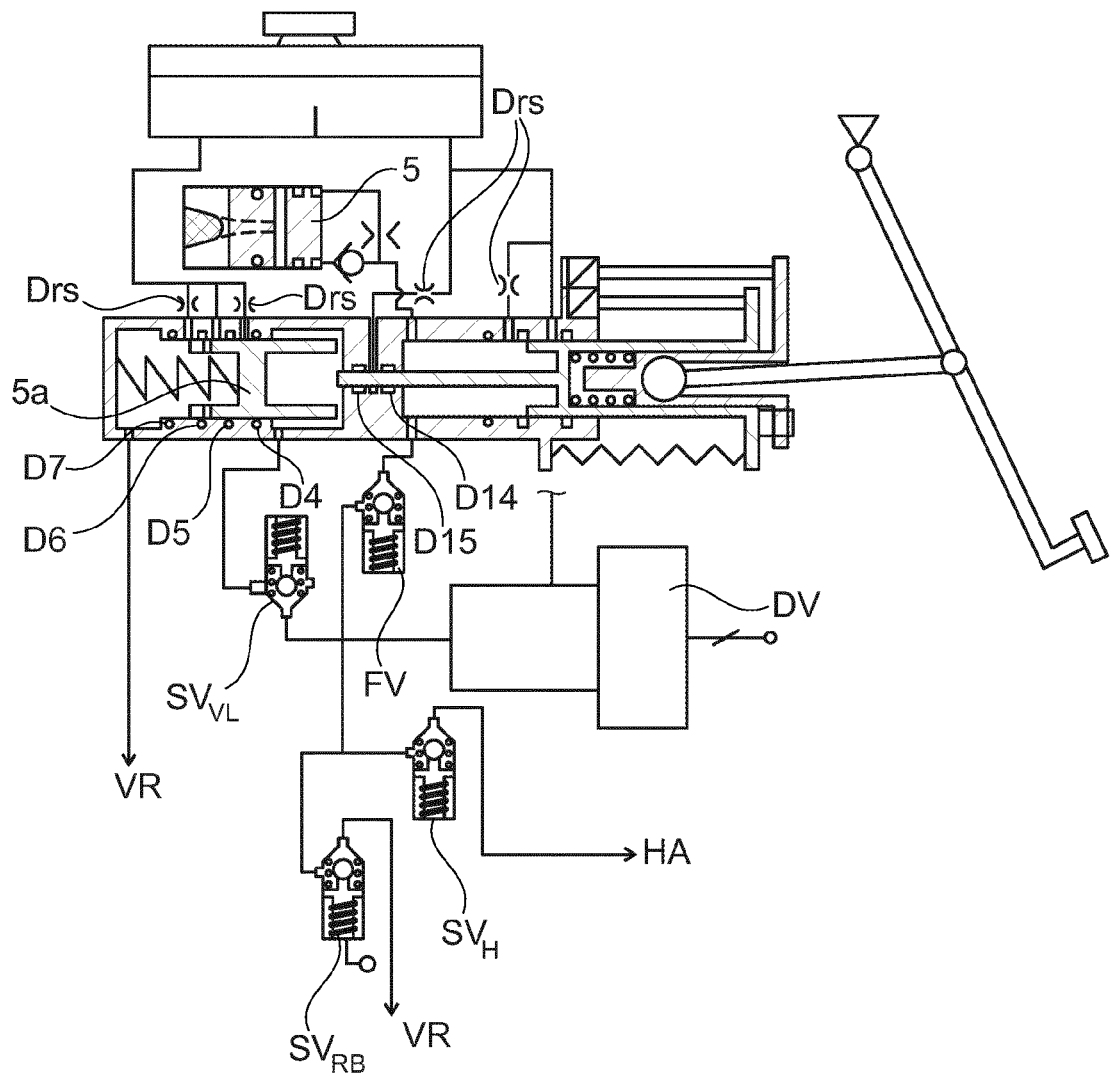
FIG. 3 shows a tandem master cylinder (THZ) for redundant front-axle (VA) control for both embodiments of the brake system (EHRI and EHR II)

FIG. 3 shows a 2-circuit tandem master cylinder as described for example in WO 2016/023994 (E138b-d) by the applicant. In comparison with the master cylinder in FIG. 1, this has an additional floating piston SK and additional redundant seals D14, D15 for sealing off the plunger of the piston SK of the master cylinder. In this case, too, this is again realized with the throttle Drs described with reference to FIG. 1. The piston SK also has redundant seals D4 and D5 with throttle Drs and seals D6 and D7 with throttle DRs. The tandem master cylinder is thus also reliably correspondingly FO.

Owing to the piston SK with separate brake circuit, valve SVLL is connected in a branch line proceeding from the line from the pressure supply DV to the piston SK. The advantage of the tandem master cylinder THZ and this valve circuit is that no failure of the pressure supply DV can occur in the event of failure of the brake circuit VL without the additional activation of valve SVVL. In the event of failure of the brake circuit VR, it is necessary, as in the case of the embodiment as per FIG. 1, after fault detection by way of the plausibility of the measurement of the pressure-volume characteristic curve with the pressure supply DV, for the corresponding valve SVVR to be closed. It should additionally be noted that the leak-tightness of all valves can be tested for example in the event of a parking stoppage and the leak-tightness of the brake circuits can be diagnosed upon every braking operation by way of the abovementioned measurement of the pressure-volume characteristic curve, such that the double fault "brake circuit failure" and "leaking valve SV" yields a low failure probability, which is the benchmark for FO.

Figure 4:
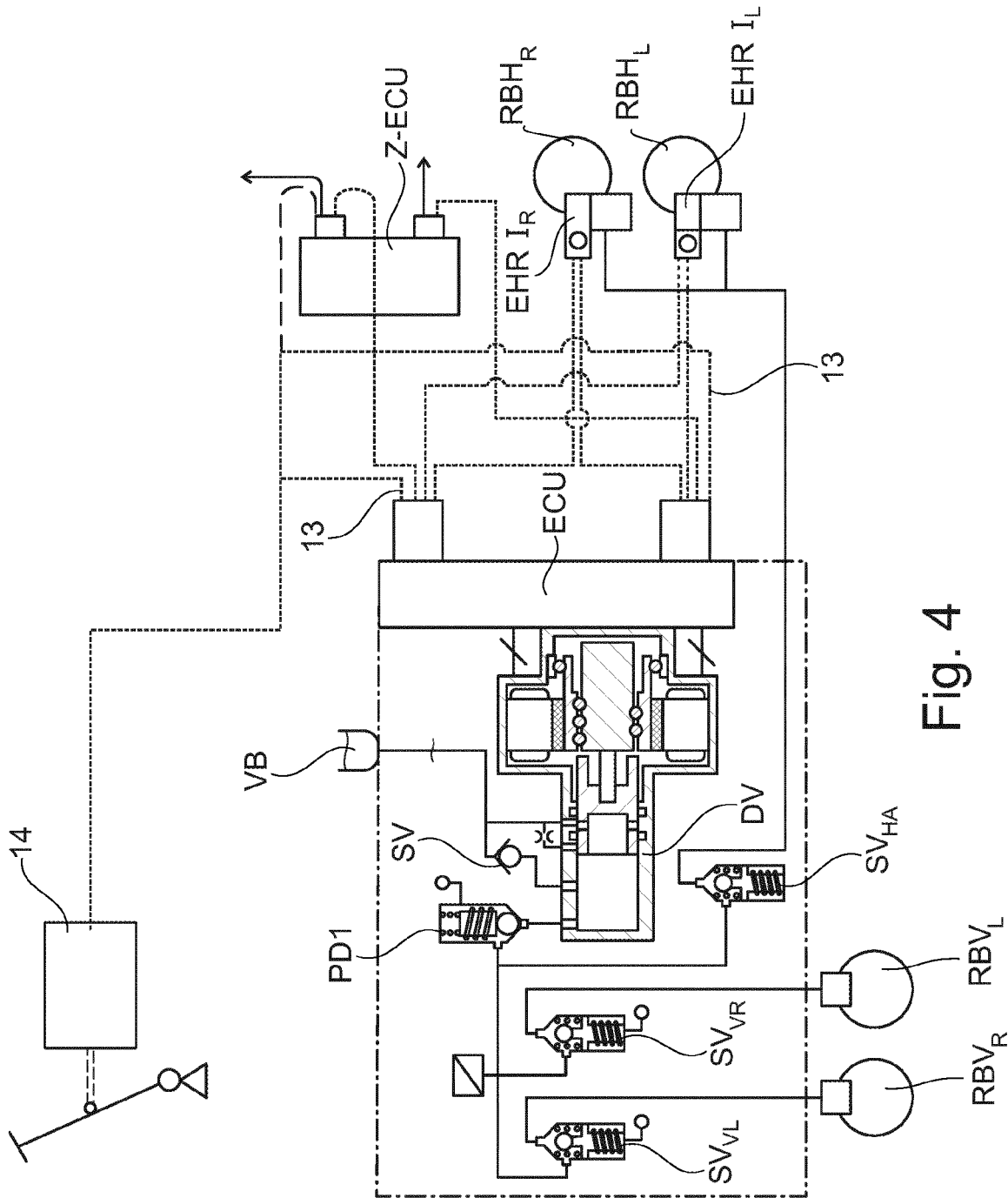
FIG. 4 shows a brake system without a master cylinder (HZ) with an electric pedal for both embodiments (EHRI and EHRII)

FIG. 4 corresponds to the arrangement or the concept of FIG. 1 with the difference that no master cylinder is provided. Rather, alternative control of the sensor ECU is provided here by means of an electric pedal or start-go switch 14. This electrical connection 13 from the electric pedal 14 to the ECU must also be redundant.

Figure 5:
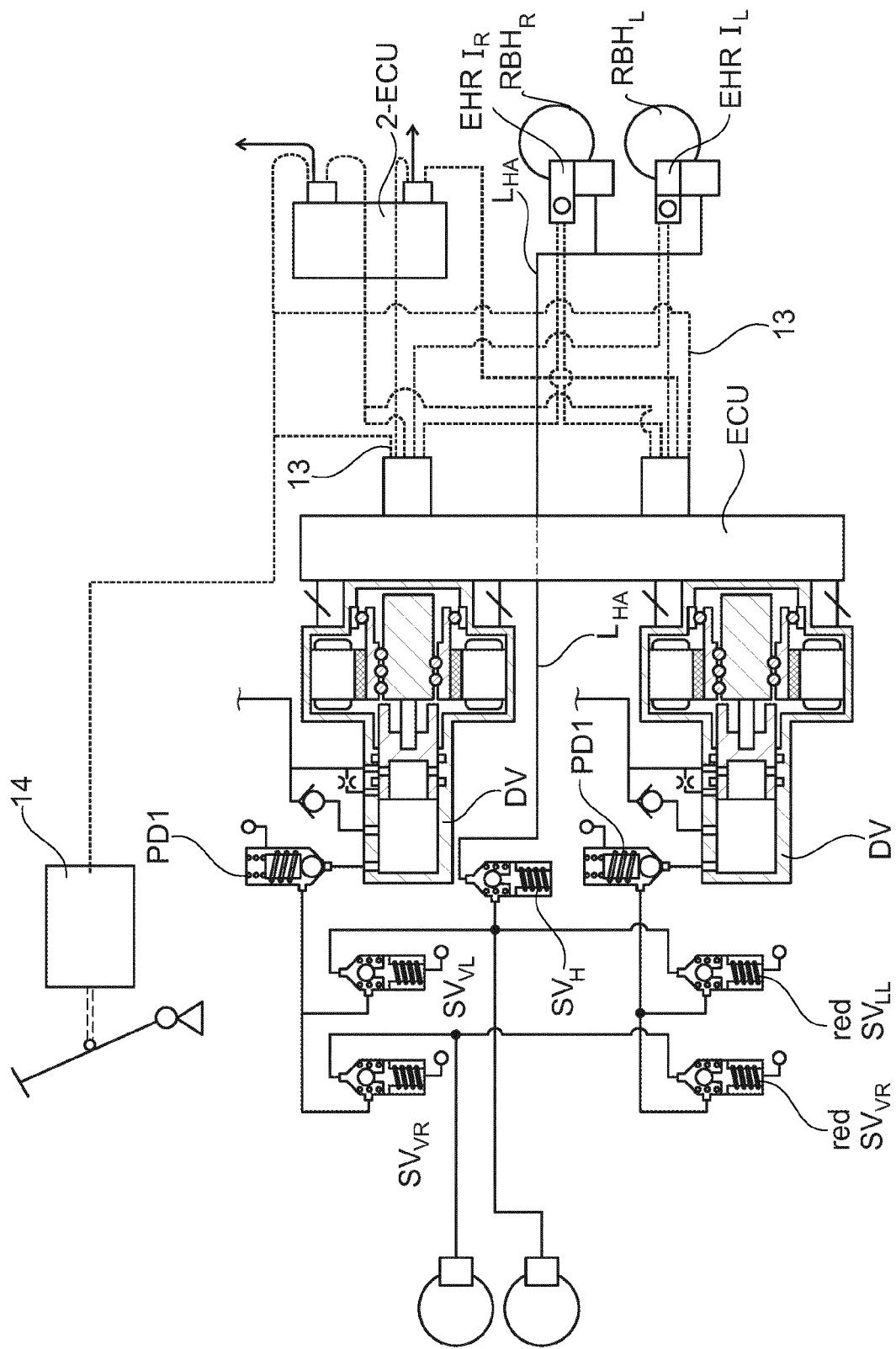
FIG. 5 shows a brake system as per FIG. 4 in redundant form for both embodiments (EHRI and EHRII)

FIG. 5 shows a further expansion of the redundancy with two valves DV and a correspondingly redundant valve SV for the front axle VA (SVVR, red. SVV etc.). As shown in FIG. 2a, the valve SVHA may also be implemented redundantly. The ECUs are implemented fully redundantly with a connection to electric pedal/start-go switch 14 with an electrical line 13. Here, too, the diagnosis during travel and primarily during parking stoppages is of great important (see also DE 10 2016 112971 by the applicant, to which reference is made here in this regard) (E150).

All of the embodiments illustrated in FIGS. 1, 2, 4 and 5 may also be equipped with a purely electrical redundant version (EHRII) instead of the electrohydraulic system combination (EHRI) (see FIG. 1c).

Figure 6:
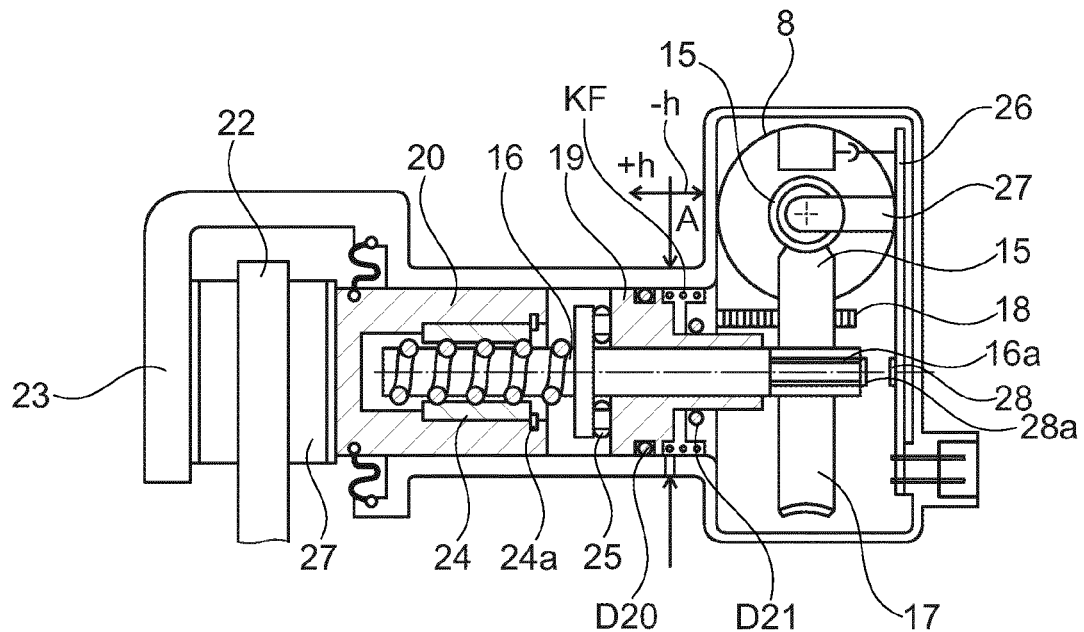
FIG. 6 shows a rear-axle (HA) actuator with adjustment piston for EHR II.

FIG. 6 shows the construction of an electrohydraulic control means EHR or of a wheel brake. A brake caliper 23 is illustrated in principle (without connection to the wheel carrier), which brake caliper, together with the brake piston 20 and the brake linings 21, acts on the brake disk 22 and thus generates the braking torque or the braking action. Two axial forces act on the brake piston 20, namely a. from the adjustment piston 19, which acts axially on the spindle 16 and the spindle nut 24 (without rotation), and b. from the electric drive, which acts via a worm wheel 17 and the spindle 16 with spindle nut 24, that is to say the ball-screw drive (KGT). The worm wheel 17 is driven by the electric motor 8 via a self-locking gear mechanism 15. Said electric motor is electrically connected via a plug connector to the printed circuit board (PCB) 26 of the electronic open-loop and closed-loop control unit (ECU) assigned to the wheel brake, as are a motor sensor 27 and a position sensor 28 with target 28a on the spindle. The axial movement of the adjustment piston 19 and of the spindle 16 with pinion can be measured by means of this position sensor 28. The adjustment piston 19 has two seals D20 and D21, which may also be implemented redundantly.

The spindle nut 24 is axially fixed by means of a fixing element 24a, such that adjustment can be performed in both directions by means of the spindle, which is necessary for the setting of the so-called lining clearance BLS between the brake disk and the brake lining. As is known, the customary residual application force of the brake piston gives rise to friction which is not negligible with regard to the $CO_2$ emissions. The setting of the lining clearance BLS by means of the setting parameters of adjustment travel and current is known from modern parking brakes. According to the invention, this clearance is preferably performed only by means of the electrical adjustment. The axial force of the spindle is absorbed by an axial bearing which is arranged on the spindle 16 between a disk, which is firmly connected to said spindle, and the adjustment piston 19.

The adjustment piston 19 is reset into the initial position primarily by the resetting forces of the brake caliper 23 via the brake piston 20, and additionally possibly by means of a piston resetting spring KF into the position A, when said adjustment piston is in a $-h$ position. The position $+/-h$ is measured by the position sensor 28 and can additionally be blocked in this position in the case of a closed SVH. From the starting position A, the piston stroke h can act and also be measured in both directions $+/-h$.

This spring KF can also be preloaded by means of a stop ring (not illustrated).

If gear mechanism blocking now occurs after a pressure build-up or an increase in braking torque, the adjustment piston 19 can, in the case of pressure dissipation, be reset into the initial position A by the resetting forces of the brake caliper 23 on the brake piston 20 in a manner dependent on the stroke contribution of the electrical adjustment. If said stroke contribution is less in the case of the pressure dissipation than in the case of the pressure build-up (approximately 5-10%), a residual travel $\Delta h$ is generated which then leads to $-h$ at the initial position, in order that no residual braking action remains.

In the case of the non-electrical adjustment, the adjustment piston is blocked by the closed valve SVH or SVHL and SVHR.

After repair of the gear mechanism blocking, $\Delta h=0$ is then set again for position A. It should be mentioned that, with an appropriate construction, gear mechanism blocking will seldom occur. However, owing to the critical effects, solutions must nevertheless be provided for this case.

Adjustment strategies other than the aforementioned adjustment strategies (a.) for hydraulic adjustment are also conceivable, for example b. electrical adjustment of only the immobilizing brake or c., in the case of fast braking torque build-up, hydraulic adjustment and, in the case of slow braking torque build-up, only electrical adjustment. Here, a complicated mixed adjustment can be omitted, that is to say position A is the same as the stop, and $-h$ does not exist. Below are some remarks on the power balance of the motor. Owing to the poor efficiency of the self-locking gear mechanism, the motor requires more power by approximately a factor of two. As already stated, the motor should fulfil TTL which are shorter by a factor of three, since the fast adjustment is done by the hydraulic adjustment and lower adjustment speeds are required for ABS/ESP. In the balance, a gain of 30% is however achieved, as well as savings in the case of the gear mechanism and the omission of the parking locks, with an appropriate size.

Figure 6A:
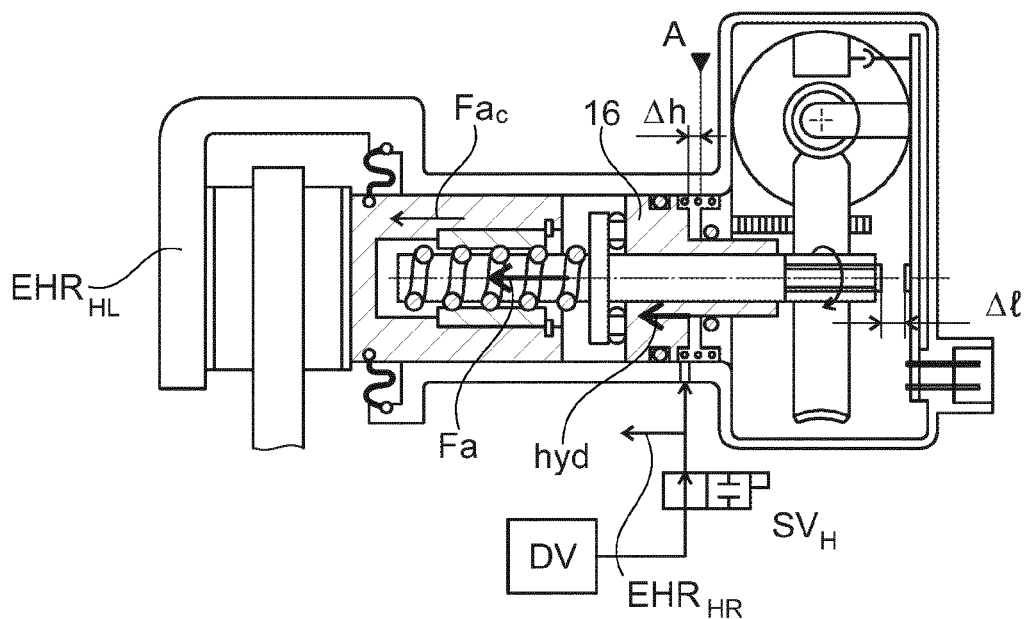
FIG. 6a shows a control means for a rear-axle (HA) brake piston of a brake system (EHRII) with deployment of the adjustment piston.

FIG. 6a shows an activated adjustment piston 16 which receives volume at the corresponding pressure from the pressure supply DV and the open valve SVH. The pressure supply DV controls the pressure in accordance with the characteristic map of the pedal travel sensors for the rear axle HA, reduced by approximately 5 to 10%. The remaining amount up to 100% is provided by the electrical adjustment by means of a characteristic map of the adjustment travel by means of motor and motor sensor. The motor current may possibly additionally be used for this purpose. The characteristic map is recorded versus the hydraulic pressure of the pressure supply DV, which yields a ΔI adjustment travel. This adjustment travel, which is proportional to the pressure, can then also take place from the characteristic map, which is proportional to the stroke of the pressure piston 29, by means of the electric drive by means of the motor sensor. This stroke delivers, by means of the surface area of the piston, a volume which leads to a pressure which is proportional to the pressure-volume characteristic curve (p-v characteristic curve) of the connected brake circuit. This characteristic curve or this characteristic map is updated in particular operating states, as is known for example from DE 10 2005 055751 (E90) by the applicant, to which reference is made here in this respect. The pressure can be determined at any time from this characteristic map and additionally measured by means of the pressure transducer DG. With this possibility of evaluating the piston travel from the volume of the pressure supply DV, there is also the potential to omit the position sensor, in particular in the case of the adjustment strategies b. and c. described above. The motor current may additionally also be used, with a preferably separate characteristic map. For this purpose, various pressure levels are input by the adjustment piston by means of pressure transducer DG by means of the pressure supply DV, for example from 10 bar in 10 steps up to 100 bar. At the corresponding step, the pressure is kept constant and the motor current is increased until a motor rotation and spindle movement occur. The measurements then yield a motor current proportional to the pressure. This eliminates all tolerance factors on the motor current. The characteristic map may also be used for the pressure dissipation and the corresponding current reduction.

For the exact setting of the braking action, a complex force sensor is required in the case of the EHR II brake system version mentioned above. As shown in FIG. 2, the electrohydraulic control EHR I may be switched by means of a common SVH or individually as shown in FIG. 2a. The adjustment strategy a, b and c is decisive here.

The electric immobilizing brake may also act for a limited time, for example in the event of failure of the electric motor, by means of the hydraulic adjustment. After the occurrence of a fault, the pressure supply DV acts with the corresponding pressure. This is held after SVH closes. The pressure supply DV and the pressure transducer DG can check, at short time intervals, whether the SVH is leak-tight, that is to say exhibits no pressure loss. The time interval can thereafter be configured to be long. This requires a particular wake-up mode for the ECU, which is maintained until servicing personnel arrive or the parking situation of the vehicle is no longer critical, for example on a slope, such that the second EHR, which is still intact, is sufficient.

Figure 7A:
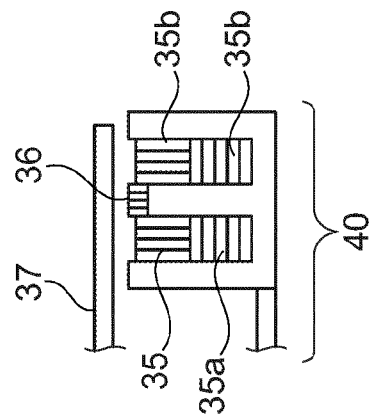
FIG. 7 shows an alternative embodiment of the actuator or of the wheel brake of FIG. 6.
Figure 7:
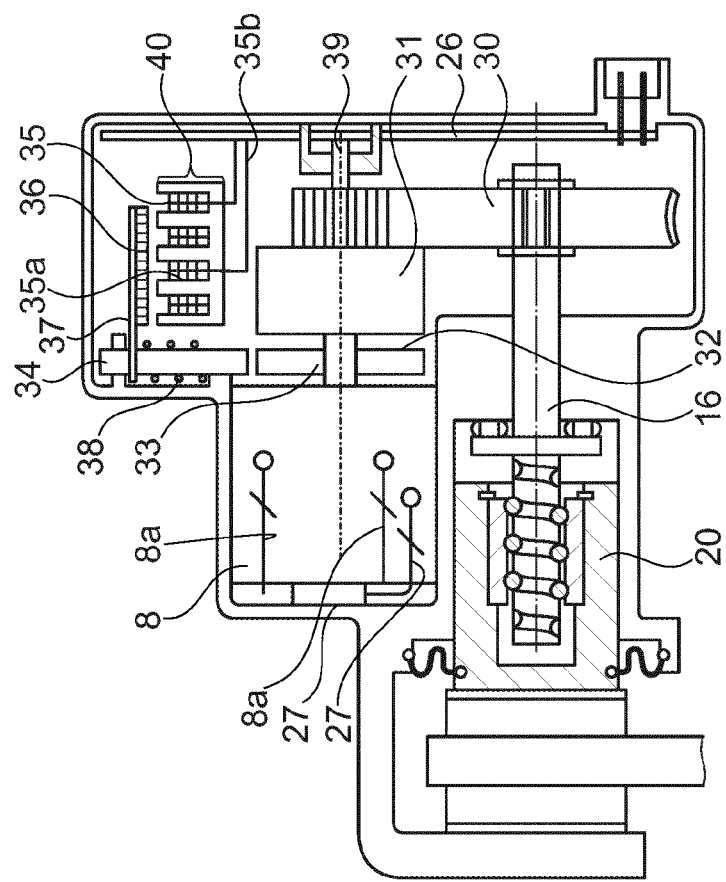

FIG. 7 shows, as an alternative to FIG. 6, the construction of an actuator without hydraulic adjustment piston for an EHRII brake system with redundancy in the case of the parking lock 40 and preferably also in the case of the 2×3-phase electric motor 8 with electrical connection 8a to the PCB 26. The motor drives the brake piston 20 in both directions, preferably via a planetary gear mechanism 31 and a non-self-locking spur gear mechanism 30, as well as a spindle with pinion 16 and a ball-screw drive KGT. The planetary gear mechanism 31 is supported in a bearing arrangement 39. A blocking wheel is preferably positioned on the shaft directly at the output of the motor, since this is where the lowest torque occurs and makes the parking device compact. A blocking slide with a return spring acts on this blocking wheel, said return spring being dimensioned such that sufficient spring force is still available even in the event of a spring failure. The pole plate 37 with magnetic clamp is connected to the blocking slide via a carrier. When the coils are excited, the magnetic force causes them to engage with detent action while the motor is rotating, and then both the excitation of the magnet and the motor are deactivated. The detent engagement can be diagnosed by way of the current-time profile or the change in the direction of rotation. By means of the magnetic clamp, the blocking slide is held in the position in which it is engaged with detent action. For unlocking, the clamping force is eliminated by changing the magnetic flux with polarity reversal, and the spring moves the blocking slide out of the locking position. Here, too, the motor is activated again in order to keep the forces on the blocking slide low. In the case of stringent safety requirements, the magnet systems 35 and 35a are redundant, with a corresponding electrical connection. Here, the magnet system is arranged in parallel and, in FIG. 7a, in series, which allows a more compact structural form.

LIST OF REFERENCE DESIGNATIONS

1 Pedal plunger
2 Piston DK
3 Pedal travel sensor 1 SM
3a Pedal travel sensor 2 SSL
4 1-circuit master cylinder (HZ)
5 Travel simulator
6 Elastic element
7 2×3-phase redundant activation means
8 Motor
9 Brake line
10 Line to the reservoir VB
10a Line to the reservoir VB
11 Float with target
12 Sensor element, for example Hall element
13 Sensor ECU, electrical connection of sensor ECU to ECU
14 Electric pedal/start-go switch
15 Self-locking gear mechanism
16 Spindle with pinion
16a Pinion
16b Axial projection of the spindle
17 Worm wheel
18 Axial guide
19 Adjustment piston
20 Brake piston
21 Brake lining
22 Disk brake
23 Brake caliper
24 Spindle nut
24a Axial fixing of the spindle nut 24
25 Axial bearing
26 PCB of the ECU
27 Motor sensor
27a Electrical connection to the motor sensor 27
28 Position sensor
28a Target of the position sensor 28
29 Pressure piston of the pressure supply DV
30 Non-self-locking spur gear mechanism
31 Planetary gear mechanism
32 Motor output shaft
33 Blocking wheel
34 Blocking slide 35 Magnet system 1 with coil
35a Magnet system 2 with coil
35b Electrical connection to the PCB
36 Magnetic clamp
37 Pole plate to the blocking slide
38 Resetting spring
39 Bearing arrangement
40 Parking lock
48 Electric motor
48a Electrical connection to the PCB
DV Pressure supply
D1-D13 Seals
D20-21 Seals on the adjustment piston
KWS Force-travel sensor
ECU Electronic open-loop and closed-loop control unit
Z-ECU Central control unit
S-ECU Sub-ECU for sensors
SV Suction valve
FV Isolating valve
RV Check valve
AS Shut-off valve
SVR Shut-off valve
SVL Shut-off valve
SVH Shut-off valve
SVHL Shut-off valve
SVHR Shut-off valve
EHR Electrohydraulic control means
DG Pressure transducer
DHK Double-stroke piston
Dr Throttle
Drs Throttle for redundant seal
VB Reservoir
WS Travel simulator
SK Floating piston
LHA Line to the rear axle
KGT Ball-screw drive
KF Piston resetting spring
EHRI Electrohydraulic system with redundancy with hydraulic adjustment piston
EHRII Electrical system without hydraulic adjustment piston
RBVR Wheel brake front right
RBVL Wheel brake front left
RBHR Wheel brake rear right
RBHL Wheel brake rear left

What is claimed is:

1. A brake system for a motor vehicle, including:
an actuating device,
wherein the actuating device is an e-pedal or a start-go switch, wherein the actuating device has no hydraulic connection to any wheel brake of the motor vehicle and has an electrical connection to at least one electronic control unit, wherein the at least one electronic control unit is fully or partially redundant and also connected to a redundant on-board electrical system;
a pressure supply device, comprising a hydraulic piston-cylinder unit driven by an electric motor, and arranged for hydraulic adjustment of a brake piston of at least one wheel brake, wherein the pressure supply device acts on exactly two wheel brakes of a front axle of the motor vehicle,
at least one electromechanically actuatable wheel brake configured for electrical adjustment of a respective brake piston of a respective wheel brake, wherein the respective wheel brake is associated with a respective rear wheel of the motor vehicle, wherein, for the electromechanical actuation of the at least one electromechanically actuatable wheel brake, a further electric motor and at least one gear mechanism are provided,
wherein one or more hydraulic and/or electrical components or subsystems of the brake system are implemented in redundant form, and
wherein the electrical connection from the actuating unit to the at least one electronic control unit is redundant and an electrical connection from the at least one electronic control unit to the at least one electromechanically actuatable wheel brake is redundant, or wherein an electrical connection from the actuating unit to a central electronic control unit, distinct from the at least one electronic control unit, is redundant and an electrical connection from the central electronic control unit to the at least one electromechanically actuatable wheel brake is redundant.

2. The brake system as claimed in claim 1, wherein the at least one electromechanically actuatable wheel brake comprises an additional or redundant, hydraulically actuatable adjustment device in order to realize an electrical and hydraulic adjustment of the at least one electromechanically actuatable wheel brake for full service braking action and immobilizing braking action.

3. The brake system as claimed in claim 2, wherein the hydraulically actuatable adjustment device comprises a hydraulic adjustment piston.

4. The brake system as claimed in claim 3, wherein the at least one electromechanically actuatable wheel brake comprises a mechanism to prevent complete blocking of adjustment and/or to ensure braking action for an increase or reduction of braking torque.

5. The brake system as claimed in claim 3, wherein the adjustment device or the adjustment piston acts on the at least one gear mechanism to transmit a displacement of the adjustment device or of the hydraulic adjustment piston to a brake piston of the electromechanically actuatable wheel brake.

6. The brake system as claimed in claim 1, wherein the at least one gear mechanism is of self-locking design and acts on the brake piston via a non-rotatable spindle and a spindle nut of a ball-screw drive.

7. The brake system as claimed in claim 3, wherein the adjustment device or the adjustment piston acts axially on a brake piston, without rotation of a spindle of a ball-screw drive, and is arranged so as to be axially displaceable, by means of a pinion, in a gearwheel of the at least one gear mechanism.

8. The brake system as claimed in claim 3, wherein the adjustment piston has a passage through which an axial projection of a spindle of a ball-screw drive extends, on which axial projection there is arranged a pinion which is mounted axially displaceably in a gearwheel of the at least one gear mechanism.

9. The brake system as claimed in claim 1, wherein the electric motors for the pressure supply device and/or the electromechanical actuation have redundant motor winding activation means.

10. The brake system as claimed in claim 1, wherein hydraulic pressure control of one or more of the wheel brakes utilizes redundant electromagnetic switching valves which are actuated in both directions in the event of large pressure differences between an inlet of the pressure supply device and an outlet to a respective wheel brake cylinder.

11. The brake system as claimed in claim 1, whether the electronic control unit is configured for hydraulic control and electrical adjustment of one or more of the wheel brakes, with at least one motor sensor in cooperation with the electronic control unit.

12. The brake system as claimed in claim 1, wherein a piston of the pressure supply device is a double-stroke piston with different effective surfaces in forward and return strokes.

13. The brake system as claimed in claim 1, wherein the brake system further includes valves for two wheel brakes configured closed-loop pressure control for anti-lock braking (ABS) by means of multiplex (MUX) operation.

14. The brake system as claimed in claim 1, further including:
at least one electromechanically actuatable wheel brake for electrical adjustment of a brake piston of wheel brakes for the rear wheels of the motor vehicle,
wherein, for the electromechanical actuation of the at least one electromechanically actuatable wheel brake, a second electric motor and at least one gear mechanism are provided, and wherein at least one electric parking device is provided, wherein the electric parking device includes electromagnetic magnetic clamps that remain locked in the absence of electrical current, and wherein the electric parking device is brought into a locking position by electrical activation, and wherein the locking is monitored by activation of the second electric motor.

15. The brake system as claimed in claim 1, wherein the pressure supply device has a hydraulic line to a reservoir and is implemented redundantly by means of a seal approximately in a middle portion of a piston stroke of the piston-cylinder unit of the pressure supply device with a suction valve in the line to the reservoir.

16. The brake system as claimed in claim 1, wherein the brake system further includes a redundant pressure supply device.

17. The brake system as claimed in claim 11, wherein a circuit board of the electronic open-loop and closed-loop control device is arranged on a housing of the at least one gear mechanism, wherein heat dissipation from the circuit board takes place substantially to a cover of the housing.

18. The brake system as claimed in claim 3, wherein, in the event of failure of the hydraulic adjustment of the adjustment piston, adjustment of the wheel brakes of the rear axle is performed electrically.

19. The brake system as claimed in claim 1, wherein different switching modes are enabled for control of braking torque, wherein approximately 90% of the braking torque is implemented by means of hydraulic adjustment, and wherein anti-lock braking/electronic stability control (ABS/ESP) and immobilizing braking action are implemented by means of electrical adjustment.

20. The brake system as claimed in claim 3, wherein the hydraulic adjustment piston has a central position which is determined by means of a spring, wherein, in the event of a reduction of braking torque by means of electrical adjustment, the spring is, by closure of a valve, ineffective for adjustment of the adjustment piston.

21. The brake system as claimed in claim 12, wherein control of the double-stroke piston is performed by means of two valves, wherein a flow rate or pressure dissipation over time is realized by means of a cross-section of a breather hole with corresponding piston positioning and evaluation of the flow rate or pressure dissipation over time by means of signals of a pressure transducer.

22. The brake system as claimed in claim 1, further including devices for diagnosing single or multiple redundancy.

23. The brake system as claimed in claim 1, further including a 12/48 V on-board electrical system and 2×3-phase control for the electric motors, wherein one section of a 3-phase or n-phase motor control means is supplied with 48V.

24. A brake system of a motor vehicle, including:
an actuating device, wherein the actuating device is an e-pedal or a start-go switch, wherein the actuating device has no hydraulic connection to any wheel brake of the motor vehicle and has an electrical connection to at least one electronic control unit, wherein the electronic control unit is fully or partially redundant and also connected to a redundant on-board electrical system;
a pressure supply device comprising a hydraulic piston-cylinder unit driven by an electric motor, arranged for hydraulic adjustment of a brake piston of at least one wheel brake, wherein the pressure supply device acts on exactly two wheel brakes of a front axle of the motor vehicle, and
at least one electromechanically actuatable wheel brake arranged for electrical adjustment of a brake piston of a respective wheel brake associated with a respective rear wheel of the motor vehicle, wherein, for the electromechanical actuation of the respective wheel brake, a further electric motor and at least one gear mechanism are provided,
wherein the at least one electromechanically actuatable wheel brake includes a hydraulic adjustment device, and
wherein at least the pressure supply device, for the hydraulic adjustment and/or control of the hydraulic adjustment device, has a redundant seal device, with a throttle device in a line to a reservoir, and
wherein a pressure supply device is provided for each wheel brake of the front axle, or
wherein the brake system further includes a 12/48 V on-board electrical system and 2×3-phase control for the electric motors in which one section of a 3-phase or n-phase motor control is supplied with 48 V.

25. A brake system for a motor vehicle, including:
an actuating device, wherein the actuating device is an e-pedal or a start-go switch,
wherein the actuating device has no hydraulic connection to any wheel brake of the motor vehicle and has an electrical connection to at least one electronic control unit, wherein the electronic control unit is fully or partially redundant and also connected to a redundant on-board electrical system;
a pressure supply device, comprising a hydraulic piston-cylinder unit driven by an electric motor, and arranged for hydraulic adjustment of a brake piston of at least one wheel brake, wherein the pressure supply device acts on exactly two wheel brakes of a front axle of the motor vehicle,
at least one electromechanically actuatable wheel brake configured for electrical adjustment of a respective brake piston of a respective wheel brake, wherein the respective wheel brake is associated with a respective rear wheel of the motor vehicle, wherein, for the electromechanical actuation of the at least one electromechanically actuatable wheel brake, a further electric motor and at least one gear mechanism are provided, wherein one or more hydraulic and/or electrical components or subsystems of the brake system are implemented in redundant form, and wherein a pressure supply device is provided for each wheel brake of the front axle, or wherein the brake system further includes a 12/48 V on-board electrical system and 2×3-phase control for the electric motors in which one section of a 3-phase or n-phase motor control is supplied with 48 V.

26. The brake system as claimed in claim 25, further including:

at least one electromechanically actuatable wheel brake for electrical adjustment of a brake piston of wheel brakes for the rear wheels of the motor vehicle, wherein, for the electromechanical actuation of the at least one electromechanically actuatable wheel brake, a second electric motor and at least one gear mechanism are provided, and wherein at least one electric parking device is provided, wherein the electric parking device includes electromagnetic magnetic clamps that remain locked in the absence of electrical current, and wherein the electric parking device is brought into a locking position by electrical activation, and wherein the locking is monitored by activation of the second electric motor.

* * * * *